United States Patent [19]

Hu et al.

[11] Patent Number: 5,531,893
[45] Date of Patent: *Jul. 2, 1996

[54] INTER-PENETRATING NETWORK CHARGE MODIFIED MICROPOROUS MEMBRANE

[75] Inventors: Hopin Hu, Ann Arbor, Mich.;
Chung-Jen Hou, Pensacola, Fla.

[73] Assignee: Gelman Sciences Inc., Ann Arbor, Mich.

[ * ] Notice: The term of this patent shall not extend beyond the expiration date of Pat. No. 5,277,812.

[21] Appl. No.: 160,427

[22] Filed: Dec. 1, 1993

Related U.S. Application Data

[63] Continuation-in-part of Ser. No. 17,036, Feb. 12, 1993, Pat. No. 5,277,812.
[51] Int. Cl.$^6$ .................................................... B01D 71/68
[52] U.S. Cl. ............................ 210/500.35; 210/500.37; 210/500.41
[58] Field of Search ..................... 210/500.41, 500.35, 210/500.37, 490

[56] References Cited

U.S. PATENT DOCUMENTS 4,473,475  9/1984  Barnes, Jr. et al. .................... 210/638

Primary Examiner—Frank Spear
Attorney, Agent, or Firm—Gifford, Krass, Groh, Sprinkle, Patmore, Anderson & Citkowski

[57] ABSTRACT

Hydrophilic inter-penetrating network charge modified microporous membranes are provided as well as a method of preparing the membranes by casting a membrane matrix blend containing matrix polymer, a solvent system, a wetting polymer compatible with the matrix polymer, and a charge modified system which forms a cross-linked interpenetrating network structure within the microporous membrane substrate during the membrane fabrication process which network structure optionally can be locked in by heat curing. The membranes are useful for filtering ultrapure water with 18 megaohm-cm resistivity for the electronic industry, and they can also be used for the removal of a variety of contaminants from fluid media, such as very fine negatively charged particles, bacteria and endotoxins, with greatly enhanced filtration efficiency.

31 Claims, No Drawings

INTER-PENETRATING NETWORK CHARGE MODIFIED MICROPOROUS MEMBRANE

REFERENCE TO RELATED APPLICATION

This application is a continuation-in-part of application Ser. No. 08/017,036 filed Feb. 12, 1993, now U.S. Pat. No. 5,277,812.

FIELD OF THE INVENTION

This invention relates to novel hydrophilic charge modified microporous membranes useful for filtration of a variety of fluids, such as ultrapure water and biological fluids.

BACKGROUND OF THE INVENTION

Membranes are usually defined as thin walled structures having an open spongy morphology with a limited pore size distribution. The preferred membranes are microporous membranes, that is, membranes having a typical pore size range between approximately 0.01 µm and 10 µm; although it is to be understood that the principles of the present invention are applicable to membranes having a still greater range of porosities. Traditionally, microporous membranes are useful to remove fine contaminants from liquid and gas media. The particulate material, such as dust or bacteria, can be removed by a microporous membrane filter through the mechanical sieving mechanism. In this mechanism, the filtration efficiency is controlled by the relative size of the particulate and membrane pore size. To achieve total particle retention, a microporous membrane with fine pore size is required to meet the requirement of the pharmaceutical and electronic industries. However, membranes with such a fine pore size tend to have undesirable characteristics of high pressure drop across the membrane, lower flow rate, and shortened membrane life. The suspended particulate materials can also be removed from the fluid by the electrokinetic adsorption mechanism. Most suspended particulate materials which are commonly encountered in industrial practice have a negative zeta potential. By imparting a positive zeta potential to the surface of filter membranes, the particulates capture efficiency can be greatly improved. This is true even for particulates whose size is much smaller than the membrane pore size. As a result, a membrane with charge modification has a lower pressure drop, a better fluid flow rate, and a longer life than a membrane filter with a comparable pore size rating but without any charge modification.

Conventional cationic charge modified microporous membranes for the filtration of ultrapure water typically have a proper charge density, but a slow 18 megaohm-cm water resistivity recovery, a characteristic critical to filtration application in the electronic industry. U.S. Pat. No. 4,702,840 discloses charge modified membranes prepared by casting an acidic polymer solution comprising a matrix polymer and a primary activated polymer having epoxy functional groups on a supportive material to form a thin film, followed by immersing the film in a liquid bath. The resulting nascent membranes are washed in water and finally dried in an oven. During this membrane fabrication process, epoxy functional groups of the primary activated polymer available for the reaction with amino or carboxyl functional groups of the polyamide matrix polymer will be de-activated through an acid-catalyzed ring-opening reaction due to the presence of an acidic solvent. Therefore, complete grafting of the primary activated polymer on the polyamide membrane surface can be a problem.

It is an object of the present invention to provide charge modified microporous membranes for filtration applications, particularly the filtration of ultrapure water used in the manufacture of computer chips in the electronic industry where a fast 18 megaohm-cm water resistivity recovery is an important requirement.

SUMMARY OF THE INVENTION

The invention concerns a hydrophilic charge modified microporous membrane having a cross-linked structure of an inter-penetrating polymer network. The membrane comprises a homogeneous matrix of polyethersulfone (PES), polyfunctional glycidyl ether, and a polymeric amine such as polyethyleneimine (PEI) and like polyamines, and polyethylene glycol. In a preferred aspect, the matrix comprising PES, the polyfunctional glycidyl ether, and polymeric amine, as described, may optionally contain a homopolymer of vinylpyrrolidone (homopolymer) or a quaternized co-polymer of vinylpyrrolidone and dimethylaminoethyl methacrylate (co-polymer) or a homopolymer and co-polymer mixture. The membrane is unique in that it is cationic charge modified, and possesses low membrane extractables and fast 18 megaohm-cm water resistivity recovery. The invention further concerns a method of making the membrane comprising the steps of casting a solution in a thin film, precipitating the nascent membrane, and washing and drying it to form a finished dried microporous membrane, thereby achieving the cross-linked structure of the inter-penetrating polymer network. Preferably the membrane is then thermal-baked to stabilize the cross-linked structure of the interpenetrating polymer network.

DETAILED DESCRIPTION OF THE INVENTION

The invention concerns a hydrophilic, cross-linked inter-penetrating network cationic charge modified, preferably isotropic, microporous filtration membrane that has low membrane extractables and allows fast recovery of ultrapure water resistivity. The membrane is formed by casting in a film a polymer matrix blend solution, preferably homogeneous, comprising polyethersulfone, polyfunctional glycidyl ether, a polyamine preferably selected from polyethyleneimine, tetraethylenepentamine, pentaethylenehexamine, and like polyamines (which matrix blend solution in a preferred aspect may optionally contain a homopolymer or a co-polymer or a mixture thereof), polyethylene glycol, and a suitable solvent or solvent mixture, precipitating the resulting film as a membrane having said network structure in air followed by a quench bath, and washing and drying the thus precipitated membrane. Preferred solvents are N-methylpyrrolidine, dimethyl formamide, or a mixture thereof.

Preferably, the polyethylene glycol has a molecular weight of 400. The solvent preferably is dimethyl formamide, but may be any solvent having similar properties.

The preferred membrane matrix solution is comprised by weight of the following:

| Constituent | Percentage Range |
| --- | --- |
| Polyethersulfone | 9.4–20.7 |
| Polyfunctional glycidylether | 0.2–0.7 |
| Polymeric amine | 0.2–1.3 |
| PVP and/or quaternized co-polymer | 0.0–2.7 |
| Polyethyleneglycol | 56.3–63.5 |
| Dimethyl formamide | 18.3–25.2 |

In a preferred embodiment, the dried membrane is baked sufficiently to stabilize said network structure. A preferred PES resin (sold under the trade name Ultrason® E-6010, BASF Corp.) has the chemical structure I:

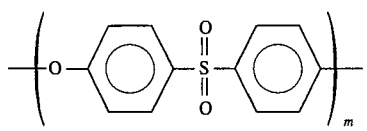

where m is an integer in the range from 30 to 1000. PES resin having properties similar to the preferred one can also be used. A preferred PEI resin (sold under the trade name Corcat® P-600, Hoechst Celanese Corp.) has a molecular weight of 60,000 and the chemical structure II:

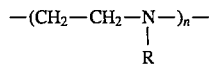

where n is an integer in the range of 900–1400, and R is hydrogen or a continuation of the polyamine chain. Other polyfunctional organic amines having chemical properties similar to the preferred one can also be used such as tetraethylenepentamine, pentaethylenehexamine and the like. A preferred polyfunctional glycidyl ether resin is 1,4-butanediol diglycidyl ether (sold under the trade name Heloxy® 67, Rhone-Poulenc Corp.), and has the molecular structure III:

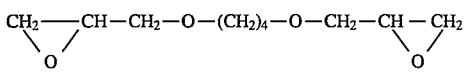

Other polyfunctional glycidyl ether resins which chemically behave similarly to the above 1,4-butanediol diglycidyl ether can also be used in this invention. This includes polyfunctional aromatic glycidyl ether resins and the like. A preferred membrane is one wherein the matrix comprises by weight about 60–95% of PES resin, about 0.1–20.0% of PEI resin, and about 0.1–20.0% of polyfunctional glycidyl ether resin, and also includes polyethylene glycol. Polymeric amines or polyfunctional organic amines impart not only charge capacity but also hydrophilicity to the microporous membrane. The preferred membrane so prepared is hydrophilic and cationically charged. Its hydrophilicity and cationic charge density will stay unchanged even after isopropanol Soxhlet extraction for 24 hours, 120° C. autoclaving for 40-minutes, or boiling in deionized water for one hour.

The invention contemplates the optional use of a homopolymer and/or a co-polymer. The use of a homopolymer, which is compatible with PES resin, ensures long-term hydrophilicity of the membrane. A preferred homopolymer resin (sold under the trade name Plasdone® K-90, GAF Chemical Corp.) has a molecular weight of 700,000. The PVP resin has the chemical structure IV:

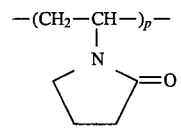

where p is an integer in the range of 360 to 6300. PVP resins having properties similar to the preferred one can also be used.

The use of a co-polymer ensures both long-term hydrophilicity and enhanced charge capacity. Preferred copolymers are sold under the trade name Gafquat®, GAF Chemicals Corp., as Gafquat 755N (average molecular weight, 1,000,000) and Gafquat 734 (average molecular weight 100,000) and have the molecular structure (n, x, and y are integers) V:

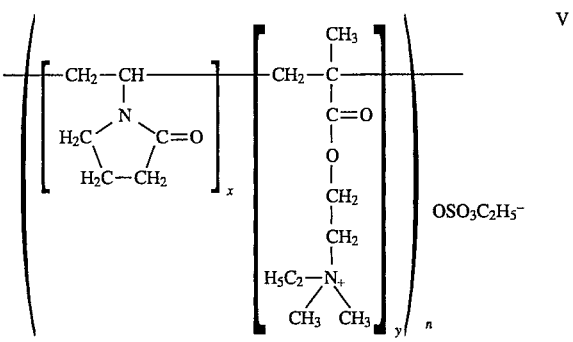

where n, x and y are integers.

Only very few quaternized polymer resins are compatible with the polyethersulfone membrane mix. Gafquat type charged resins are preferred.

Still another preferred membrane is one wherein the matrix comprises by weight about 60–95% of PES resin, about 0.1–25% of the homopolymer and/or co-polymer, about 0.1–20% of PEI resin, and about 0.1–20% of polyfunctional glycidyl ether resin based upon the total amount of these resins included in the blend. The preferred membrane has a fast 18 megaohm-cm water resistivity recovery. It is believed that in the process of the present invention, the homopolymer and/or co-polymer is firmly trapped within the inter-penetrating, interlocked cross-linked network due to (1) strong interaction, such as hydrogen bonding or charge-dipole interaction, between the homopolymer and/or copolymer and the cross-linked network, and (2) entanglement between polymer chains. The resulting charge modified microporous membrane shows a low pH-dependency in its charge capacity because of the presence of the homopolymer and/or co-polymer.

Although the results suggest the advantages of a homopolymer and/or co-polymer in the polymer solution to prepare hydrophilic cationic charge modified membrane, there is no requirement that the present invention be restricted to the use of this material. Very high quality charge modified membranes may be prepared from PES, PEI, polyfunctional glycidyl ether, and polyethylene glycol.

One important feature of this invention is that the membrane does not require a post-treatment, but is prepared directly by casting a polymer blend. For comparison, an uncharged membrane of similar pore size to a preferred membrane of the invention was first prepared by casting polymer solution lacking both PEI resin and polyfunctional glycidyl ether resin, and then post-treating with coating solution containing PEI and polyfunctional glycidyl ether, followed by thermal curing (Comparative Example 2 below) to prepare the cationic charge modified membrane analogous to the preferred membrane. This comparison membrane showed a much slower 18 megaohm-cm water resistivity recovery and a lower cationic charge density evidenced by dye adsorption than the preferred membrane according to this invention. This shows that the membrane performance varies as the membrane fabrication process is altered even if the chemistry used is similar.

Reasons for the low extractables property of cationic charge modified polyethersulfone microporous membranes of the invention are speculated to be as follows:

1) the formation of a cross-linked inter-penetrating, inter-locked charged network;

2) the direct reaction between the reactive sites of the charged cross-linked network and the reactive end groups of polyethersulfone;

3) very strong interaction, such as hydrogen bonding or charge-dipole interaction, within the charged cross-linked network containing amino or hydroxyl groups, which may be enhanced by the optional addition of a homopolymer and/or co-polymer.

Preferably, the polymer solution is cast as a liquid film on a suitable support such as a glass plate or a moving stainless-steel belt and subjected to conditions of controlled temperature (practical range between 10° C. and 35° C.), and relative humidity (practical range between 50% and 80%). The liquid film of the polymer imbibes sufficient water to affect partial precipitation of polymer from the solvent. Completion of the precipitation occurs in a quench bath which contains a non-solvent such as water or a non-solvent mixture such as water-alcohol. The membrane is dried in an oven suitably at about 70° C. and optionally, heat-treated or baked sufficiently to stabilize the network structure (preferably carried out at temperature from 90°–140° C. for 1 to 48 hours, more preferably for at least 3 hours and most preferably for at least 8 hours. A preferred temperature is about 120° C.).

Another unique aspect of the invention results from the optional heat treatment at elevated temperature. It was found that the unbaked membrane which did not experience the final thermal baking showed a relatively much slower 18 megaohm-cm water resistivity recovery than did membranes which were baked as described above. However, unheated membranes do generally have a higher cationic charge density (as determined by the anionic dye adsorption) than the membranes heated for the described stabilization of the network structure.

PEI polymer will react with epoxy functional groups of diglycidyl ether resin to form a cross-linked material that has a high degree of insolubility. The reaction rate can be enhanced by various methods including heating. During the polymer solution preparation process, it can be reasonably assumed that PEI polymer and diglycidyl ether resin are uniformly dissipated in the homogeneous polymer solution of PES, polyethylene glycol, solvent, and, optionally, a homopolymer and/or co-polymer. The complete reaction of PEI polymer and the diglycidyl ether molecule is restricted at this stage because of the high viscosity of the polymer solution system and the low concentration that is used of these two resins. As the phase inversion process progresses, the partially cross-linked reaction adduct entangles the PES polymer to form an inter-penetrating network. As a result, the formed membrane after drying comprises a uniform interlocked structure of reaction adduct with PES. The complete reaction of PEI polymer and diglycidyl ether is then accomplished by the optional subsequent thermal baking at higher temperature. While the above is a plausible mechanism proposed for this invention, it has not been rigorously proven so that the invention is not limited to this or any other theory. Nevertheless, the mechanism can satisfactorily explain the fact that the optionally baked membrane has a faster 18 megaohm-cm water resistivity recovery than the unbaked membrane because of the consequence of lower extractables attributed to complete reaction. The lower cationic charge density associated with the further baked membrane is presumably due to gradual decomposition of cross-linked PEI adduct in the membrane structure.

DEFINITIONS

Water Bubble Point

This common test for microporous membrane is a measurement of the largest pores in a membrane. It consists of expelling water from a water-wetted membrane by air pressure. Pore size and the pressure necessary to remove water from that pore are related by:

$$D=B\gamma\cos\theta/P$$

where P is the pressure, $\theta$ is the water-solid contact angle between the membrane material and water, $\gamma$ is water-air surface tension, D is pore diameter, and B is a constant.

Isopropanol/Water Bubble Point

The water bubble point is not practically suitable for characterizing the pore size of tight microporous membranes due to the safety concern in most laboratories. Therefore, an alcohol mixture, i.e., isopropanol/water (60/40, by volume) is used to characterize the tight membranes in this invention.

Water Flow Rate

Water flow rate is the flow rate of water passing through the membrane of given dimension, and commonly expressed in seconds/100 ml of water at a given pressure.

Dye Adsorption

Membrane surfaces which have a positive zeta potential will adsorb negatively charged organic dyes. This can be used to semi-quantify the charging efficiency of charged membrane.

Extractables

The amount of extractables is determined by boiling the membrane in water for one hour and measuring the weight loss.

EXAMPLES (Percentage by Weight)

Comparative Example 1

Preparation of 0.1 μm Uncharged Polyethersulfone Membrane

Polyethersulfone (Ultrason E-6010 available from BASF), dimethyl formamide, polyethylene glycol 400, and polyvinylpyrrolidone were mixed in the ratio of 17.5:20.0:61.2:1.3. The mixture was stirred to homogeneity and cast at 7–10 mil on glass or stainless steel plate. It was subjected to 60–70% relative humidity ambient air until it became opaque. The film was then immersed in water to leach out excess solvent for 2–12 hours. It was then dried at 70° C. The membrane obtained was hydrophilic. The membrane characteristics were:

Isopropanol/Water Bubble Point: 44 psi

Water Flow Rate: 110 seconds/9.62 cm², 100 ml at 10 psi

Comparative Example 2

Preparation of 0.1 μm Cationically Charged Polyethersulfone Membrane by Post-Treatment The membrane made in Comparative Example 1 was placed in an aqueous solution containing 1.0% of polyethyleneimine (Corcat P-600, available from Hoechst Celanese), and 2.35% of 1,4-butanediol diglycidyl ether (Heloxy 67, available from Rhone-Poulenc) for a few minutes, and then was removed from the coating solution. Excess polymer solution was wiped off from the membrane using squeegee bars.

The membrane was then baked in a vented oven at 115° C. for one hour. After baking, the membrane was washed with deionized water at 90° C. for 20 minutes and finally dried at 70° C. for 20 minutes. The membrane performance was:

Isopropanol/Water Bubble Point: 45 psi

Water Flow Rate: 120 seconds/9.62 cm$^2$, 100 ml at 10 psi

The membrane so prepared had cationic charge evidenced by anionic dye adsorption. However, the modified membrane showed a relatively slower 18 megaohm-cm water resistivity recovery than those made according to the present invention.

Example 3

Preparation of 0.1 μm Cationically Charged Polyethersulfone Membrane

A polymer casting solution was prepared according to the invention by mixing polyethersulfone, polyvinylpyrrolidone, polyethylene glycol 400, dimethyl formamide, polyethyleneimine (Corcat P-600, available from Hoechst Celanese), and 1,4-butanediol diglycidyl ether (Heloxy 67 available from Rhone-Poulenc) in the ratio of 16.0:1.2:62.6:19.0:0.8:0.4. The polymer solution was cast on a glass plate and set as in Comparative Example 1. The membrane so prepared was hydrophilic and cationically charged, and had the characteristics as follows:

Isopropanol/Water Bubble Point: 42 psi

Water Flow Rate: 123 seconds/9.62 cm$^2$, 100 ml at 10 psi

Example 4

Preparation of 0.1 μm Cationically Charged Polyethersulfone Membrane

A polymer casting solution was prepared according to the invention by mixing polyethersulfone, polyethylene glycol 400, dimethyl formamide, polyethylene imine (Corcat P-600, available from Hoechst Celanese), and 1,4-butanediol diglycidyl ether (Heloxy 67 available from Rhone-Poulenc) in the ratio of 16.0:62.6:20.2:0.8:0.4. The polymer solution was cast on a glass plate and set as in Comparative Example 1. The membrane so prepared was hydrophilic and cationically charged, and had characteristics similar to those of the cationically charged membrane prepared as in Example 3.

Example 5

Preparation of 0.1 μm Cationically Charged Polyethersulfone Membrane

A polymer casting solution was prepared by mixing polyethersulfone, quaternized polymer (Gafquat 755 N, available from GAF Chemical Corp.), polyethylene glycol 400, dimethyl formamide, polyethyleneimine (Corcat P-600, available from Hoechst Celanese), and 1,4-butanediol diglycidyl ether together in the ratio of 17.0: 2.6: 60.5: 18.6: 0.9: 0.4. The polymer solution was cast on a glass plate and set as Comparative Example 1. The membrane so prepared was hydrophilic and cationically charged, and had the characteristics as follows:

Isopropanol/Water Bubble Point: 39 psi

Water Flow Rate: 102.8 seconds/9.62 cm$^2$, 100 ml at 10 psi

Example 6

Preparation of 0.1 μm Cationically Charged Polyethersulfone Membrane

The preparation procedure for this membrane was the same as that described in Example 3 except that the membrane after drying at 70° C. was further oven-baked at 120° C. for one hour. The membrane so prepared was hydrophilic and cationically charged, and had the following characteristics:

Isopropanol/Water Bubble Point: 44 psi

Water Flow Rate: 130 seconds/9.62 cm$^2$, 100 ml at 10 psi

Example 7

Preparation of 0.1 μm Cationically Charged Polyethersulfone Membrane

A casting solution was prepared by mixing polyethersulfone, Gafquat 755N, polyethylene glycol 400, dimethyl formamide, tetraethylenepentamine, and 1,4-butanediol diglycidyl ether together in the ratio of 16.4:2.6:62.0:18.6:0.2:0.2. The polymer solution was cast on a glass plate and set as in Comparative Example 1. The membrane so obtained was hydrophilic and cationically charged as evidenced by anionic dye adsorption. The membrane performance was as follows:

Isopropanol/Water Bubble Point: 37.4 psi

Water Flow Rate: 108.3 seconds/9.62 cm$^2$, 100 ml at 10 psi

Example 8

Preparation of 0.1 μm Cationically Charged Polyethersulfone Membrane

A casting solution was prepared by mixing polyethersulfone, Gafquat 755N, polyethylene glycol 400, dimethyl formamide, pentaethylenehexamine, and 1,4-butanediol diglycidyl ether together in the ratio of 17.0:2.0:61.4:18.3:0.7:0.6. The polymer solution was cast on a glass plate and set as in Comparative Example 1. The membrane so obtained was hydrophilic and cationically charged as evidenced by anionic dye adsorption. The membrane performance was as follows:

Isopropanol/Water Bubble Point: 41.2 psi

Water Flow Rate: 80.9 seconds/9.62 cm$^2$, 100 ml at 10 psi

Example 9

Preparation of 0.03 μm Cationically Charged Polyethersulfone Membrane

A casting solution was prepared by mixing polyethersulfone, Gafquat 755N, polyethylene glycol 400, dimethyl formamide, polyethyleneimine, and 1,4-butanediol diglycidyl ether together in the ratio of 20.5:2.2:56.8:19.2:0.9:0.4. The polymer solution was cast on a glass plate and set as in Comparative Example 1. The membrane so obtained was hydrophilic and cationically charged as evidenced by anionic dye adsorption. The membrane performance was as follows:

Isopropanol/Water Bubble Point: 58 psi

Water Flow Rate: 186.4 seconds/9.62 cm², 100 ml at 10 psi

Example 10

Preparation of 0.03 µm Cationically Charged Polyethersulfone Membrane

A casting solution was prepared by mixing polyethersulfone, Gafquat 755N, polyethylene glycol 400, dimethyl formamide, pentaethylenehexamine, and 1,4-butanediol diglycidyl ether together in the ratio of 20.6:2.5:56.3:19.1:0.8:0.7. The polymer solution was cast on a glass plate and set as in Comparative Example 1. The membrane so obtained was hydrophilic and cationically charged as evidenced by anionic dye adsorption. The membrane performance was as follows:

Isopropanol/Water Bubble Point: 62 psi
Water Flow Rate: 213.6 seconds/9.62 cm², 100 ml at 10 psi Example 11

Preparation of 0.03 µm Cationically Charged Polyethersulfone Membrane

A casting solution was prepared by mixing polyethersulfone, polyvinylpyrrolidone, polyethylene glycol 400, dimethyl formamide, polyethyleneimine, and 1,4-butanediol diglycidyl ether together in the ratio of 20.7:1.1:58.0:19.0:0.8:0.4. The polymer solution was cast on a glass plate and set as in Comparative Example 1. The membrane so obtained was hydrophilic and cationically charged as evidenced by anionic dye adsorption. The membrane performance was as follows:

Isopropanol/Water Bubble Point: 66.7 psi
Water Flow Rate: 267 seconds/9.62 cm², 100 ml at 10 psi Example 12

Preparation of 0.03 µm Cationically Charged Polyethersulfone Membrane

The membrane was prepared in the same manner as described in Example 11 except that the membrane after drying at 70° C. was further oven-baked at 120° C. for 48 hours. The membrane so prepared was hydrophilic and cationically charged, and had the following characteristics:

Isopropanol/Water Bubble Point: 66 psi
Water Flow Rate: 260 seconds/9.62 cm², 100 ml at 10 psi After Soxhlet extraction using isopropanol for 24 hours, the membrane did not lose its hydrophilicity, flow rate, and cationic charge capacity.

Example 13

Preparation of 0.2 µm Cationically Charged Polyethersulfone Membrane

A polymer casting solution was prepared by mixing polyethersulfone, polyvinylpyrrolidone, polyethylene glycol 400, dimethyl formamide, polyethyleneimine, 1,4-butanediol diglycidyl ether together in the ratio of 12.9:0.6:61.6:23.7:0.8:0.4. The polymer solution was cast on a glass plate and set as in Comparative Example 1. The membrane so prepared was hydrophilic and cationically charged, and had the characteristics as follows:

Water Bubble Point: 62.7 psi
Water Flow Rate: 23.2 seconds/9.62 cm², 100 ml at 10 psi Example 14

Preparation of 0.45 µm Cationically Charged Polyethersulfone Membrane

A polymer casting solution was prepared by mixing polyethersulfone, polyvinylpyrrolidone, polyethylene glycol 400, dimethyl formamide, polyethyleneimine, 1,4-butanediol diglycidyl ether together in the ratio of 9.4:2.7:63.5:23.2:0.8:0.4. The polymer solution was cast on a glass plate and set as in Comparative Example 1. The membrane so prepared was hydrophilic and cationically charged, and had the characteristics as follows:

Water Bubble Point: 41.3 psi
Water Flow Rate: 10.1 seconds/9.62 cm², 100 ml at 10 psi Example 15

Preparation of 0.8 µm Cationically Charged Polyethersulfone Membrane

A polymer casting solution was prepared by mixing polyethersulfone, polyvinylpyrrolidone, polyethylene glycol 400, dimethyl formamide, polyethyleneimine, 1,4-butanediol diglycidyl ether together in the ratio of 9.4:0.5:63.0:25.2:1.3:0.6. The polymer solution was cast on a glass plate and set as in Comparative Example 1. The membrane so prepared was hydrophilic and cationically charged, and had the characteristics as follows:

Water Bubble Point: 22.1 psi
Water Flow Rate: 4.3 seconds/9.62 cm², 100 ml at 10 psi Example 16

Anionic Dye Adsorption of the Membrane

The dye adsorption test was done with a dilute aqueous solution (10 ppm) of a negatively charged Metanil Yellow. The solution was filtered through the test samples (47 mm in diameter) at 10 psi; the end point of testing was visually determined and expressed in terms of volume of dye solution when the filtrate penetrating through membrane samples became very light yellow. The accuracy of this dye adsorption test was about 5 ml of dye solution. The dye adsorption capacity of membrane samples are set out in Table I below.

TABLE I

DYE ADSORPTION CAPACITY OF VARIOUS MEMBRANES

| Membrane Sample of Example # | Volume of 10 PPM of Metanil Yellow Dye Adsorption (ml) |
| --- | --- |
| 1 (Comparative) | 5 |
| 2 (Comparative) | 23 |
| 3 | 41 |
| 4 | 43 |
| 5 | 42 |
| 6 | 40 |
| 7 | 15 |
| 8 | 25 |
| 9 | 32 |
| 10 | 23 |
| 11 | 40 |
| 12 | 15 |
| 13 | 15 |
| 14 | 10 |
| 15 | 19 |

Example 17

Measurement of 18 megaohm-cm Water Resistivity Recovery

A 293-mm diameter disc of the membrane sample was installed in a stainless steel housing which allowed pressurized water to flow through the membrane sample. Prefiltered and deionized 18 megaohm-cm water was caused to flow through the membrane sample at a constant flow rate of 0.9–1.0 gallons per minute. The effluent resistivity was constantly monitored. The length of time which was required to reach the same resistivity level as upstream was determined and recorded. The test results of membrane samples are summarized in Table II below.

TABLE II

RESISTIVITY RECOVERY

| Membrane Sample Example # | Flush out Time to 18 Megaohm-cm (minutes) |
|---|---|
| 2 (Comparative) | 95.0–100.0 |
| 11 | 14.5–35.0 |
| 12 | 2.5–10.5 |

Example 18

Measurement of Membrane Extractables

The degree of extractables of hydrophilic cationically charged polyethersulfone membranes was determined by pre-weighing the dry membrane samples, then by boiling them in DI water for 1 hour. After completely drying, the membrane extractables are expressed in terms of percentage weight loss and shown in Table III below.

TABLE III

MEMBRANE EXTRACTABLES

| Membrane Sample of Example # | Extractables % |
|---|---|
| 11 | 0.145 |
| 12 | 0.118 |

Example 19

Comparison of Membrane Performance Before and After Extraction With Boiling Water Cationically charged polyethersulfone membranes prepared from Example 7, all in the form of 47-mm disks, were subjected to extraction with boiling water as in Example 18. The membrane performance before and after extraction with boiling water is shown in Table IV.

TABLE IV

| Membrane Sample | Before Extraction | After Extraction |
|---|---|---|
| Dye adsorption capacity (10 PPM of Metanil Yellow) | 15 ml | 13 ml |
| Isopropanol/water bubble point | 66.0 psi | 65.3 psi |
| Water flow rate (seconds/9.62 cm², 100 ml at 10 psi) | 260.0 | 255.6 |

It will thus be seen that the present invention provides improved, cationically charged porous membranes. The membranes have a very low level of extractable materials retained therein. They retain a high degree of charge and possess good flow properties. This combination of properties makes them ideally suited for use in preparing high purity water for the semiconductor industry. In addition, the method by which they are produced, being more reliable than that of the aforementioned U.S. Pat. No. 4,702,840, results in a significant saving of time and money.

It should be appreciated that the foregoing discussion, description and examples are meant to illustrate particular embodiments of the invention and are not meant to be limitations on the practice thereof. It is the following claims, including all equivalents, which define the scope of the invention.

We claim:

1. A hydrophilic inter-penetrating network cationic charge modified microporous filtration membrane having a pore size range between approximately 0.01 μm and 10 μm and further having low membrane extractables and fast recovery of ultrapure water resistivity, comprising:

a microporous membrane matrix, having therewithin a cross-linked inter-penetrating polymer network structure, said matrix being formed by casting in a film a blended polymer membrane solution comprising polyethersulfone, polyfunctional glycidyl ether, polyamine, polyethylene glycol and a solvent, precipitating the resulting film as a membrane having said network structure in a quench bath, and washing and drying the thus precipitated membrane.

2. A hydrophilic inter-penetrating network cationic charge modified microporous filtration membrane having a pore size range between approximately 0.1 μm and 10 μm and further having low membrane extractables and fast recovery of ultrapure water resistivity, comprising:

a microporous membrane matrix, having therewithin a cross-linked inter-penetrating polymer network structure, said matrix being formed by casting in a film a blended polymer membrane solution comprising polyethersulfone, polyfunctional glycidyl ether, polyamine, polyethylene glycol, a solvent and a member selected from a homopolymer of vinylpyrrolidone, a co-polymer of vinylpyrrolidone and dimethylaminoethyl methacrylate, or a mixture of said homopolymer and copolymer, precipitating the resulting film as a membrane having said network structure in a quench bath, and washing and drying the thus precipitated membrane.

3. A membrane according to claim 1 or claim 2, comprising baking the thus dried membrane sufficiently to stabilize said network structure.

4. A filtration membrane according to claim 1 or claim 2, wherein said polyethersulfone has the chemical structure I:

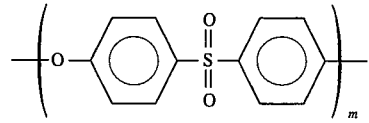

where m is an integer in the range from 30 to 1000.

5. A filtration membrane according to claim 1 or claim 2, wherein said polyamine comprises polyethyleneimine having the chemical structure II:

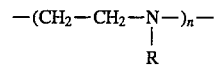

where n is an integer in the range from 900 to 1400 and R is hydrogen or a continuation of the polymer chain.

6. A filtration membrane according to claim 1 or claim 2, wherein said polyamine comprises tetraethylenepentamine.

7. A filtration membrane according to claim 1 or claim 2, wherein said polyamine comprises pentaethylenehexamine.

8. A filtration membrane according to claim 1 or claim 2, wherein said polyfunctional glycidyl ether comprises 1,4-butanediol diglycidyl ether having the chemical structure III:

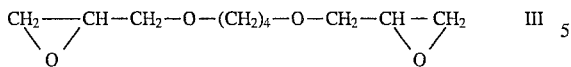

9. A filtration membrane according to claim 1 or claim 2, wherein said polyethylene glycol has a molecular weight of 400.

10. A filtration membrane according to claim 1 or claim 2, wherein said solvent is dimethyl formamide.

11. A filtration membrane according to claim 2, wherein said homopolymer of vinylpyrrolidone has the chemical structure IV:

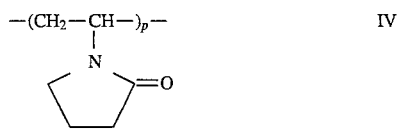

where p is an integer in the range of 360 to 6300.

12. A filtration membrane according to claim 2, wherein said quaternized co-polymer of vinylpyrrolidone and dimethylaminoethyl methacrylate has the chemical structure V:

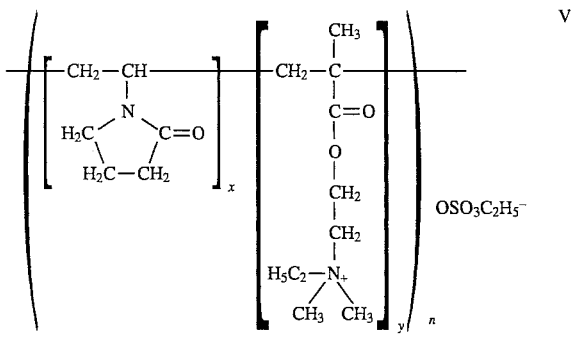

where n, x and y are integers.

13. A filtration membrane according to claim 2, wherein said homopolymer of vinylpyrrolidone has the chemical structure IV:

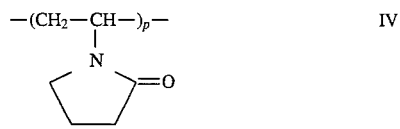

where p is an integer in the range of 360 to 6300 and said quaternized co-polymer of vinylpyrrolidone and dimethylaminoethyol methacrylate has the chemical structure V:

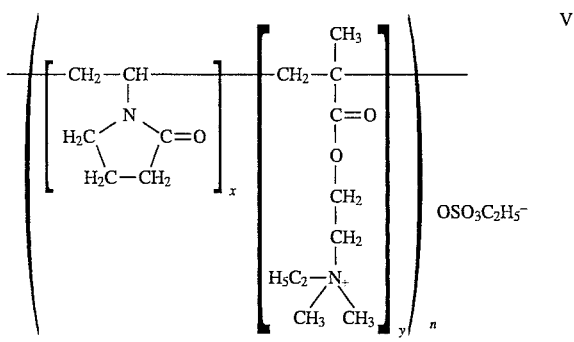

where n, x and y are integers.

14. A filtration membrane according to claim 1, wherein said matrix blend comprises by weight about 60–95% polyethersulfone resin, about 0.1–20% polyethyleneimine resin, about 0.1–20% polyfunctional glycidyl ether resin.

15. A filtration membrane according to claim 2, wherein said matrix blend comprises by weight about 60–95% polyethersulfone resin, about 0.1–20% polyethyleneimine resin, about 0.1–20% polyfunctional glycidyl ether resin, and about 0.1–25% homopolymer of vinylpyrrolidone and/or quaternized co-polymer of vinylpyrrolidone and dimethylaminoethyl methacrylate.

16. A filtration membrane according to claim 3, wherein said polyethersulfone has the chemical structure I:

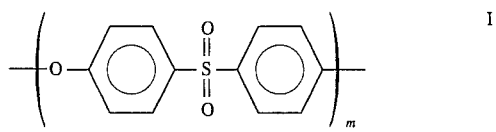

where m is an integer in the range from 30 to 1000.

17. A filtration membrane according to claim 3, wherein said polyamine comprises polyethyleneimine having the chemical structure II:

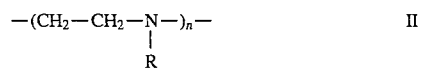

where n is an integer in the range from 900 to 1400 and R is hydrogen or a continuation of the polymer chain.

18. A filtration membrane according to claim 3, wherein said polyamine comprises tetraethylenepentamine.

19. A filtration membrane according to claim 3, wherein said polyamine comprises pentaethylenehexamine.

20. A filtration membrane according to claim 3, wherein said polyfunctional glycidyl ether comprises 1,4-butanediol diglycidyl ether having the chemical structure III:

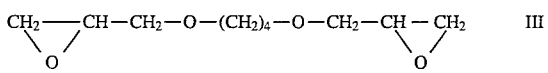

21. A filtration membrane according to claim 3, wherein said polyethylene glycol has a molecular weight of 400.

22. A filtration membrane according to claim 3, wherein said solvent is dimethyl formamide.

23. A filtration membrane according to claim 3, wherein said homopolymer of vinylpyrrolidone has the chemical structure IV:

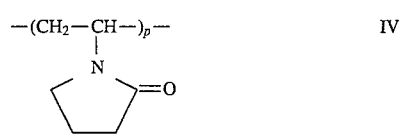

where p is an integer in the range of 360 to 6300.

24. A filtration membrane according to claim 3, wherein said quaternized co-polymer of vinylpyrrolidone and dimethylaminoethyl methacrylate has the chemical structure V:

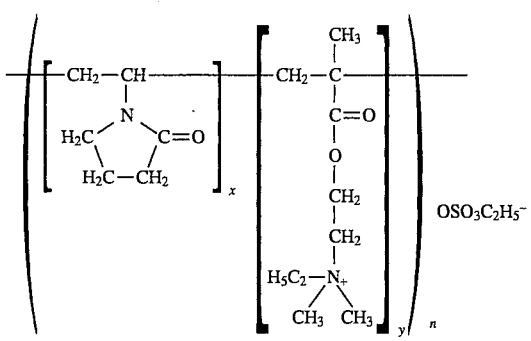

where n, x and y are integers.

25. A filtration membrane according to claim 3, wherein said homopolymer of vinylpyrrolidone has the chemical structure IV:

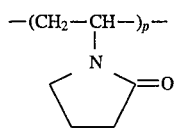

where p is an integer in the range of 360 to 6300 and said quaternized co-polymer of vinylpyrrolidone and dimethylaminoethyl methacrylate has the chemical structure v:

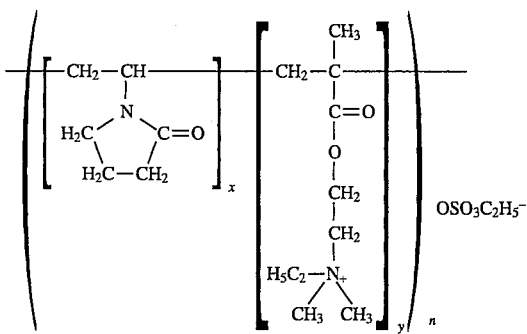

where n, x and y are integers.

26. A filtration membrane according to claim 3, wherein said matrix blend comprises by weight about 60–95% polyethersulfone resin, about 0.1–20% polyethyleneimine resin, and about 0.1–20% polyfunctional glycidyl ether resin.

27. A filtration membrane according to claim 3, wherein said matrix blend comprises by weight about 60–95% polyethersulfone resin, about 0.1–20% polyethyleneimine resin, about 0.1–20% polyfunctional glycidyl ether resin, and about 0.1–25% homopolymer of vinylpyrrolidone and/or quaternized co-polymer of vinylpyrrolidone and dimethylaminoethyl methacrylate.

28. A method of preparing a hydrophilic charge modified microporous filtration membrane having a network structure according to claim 1, comprising the steps of forming in a solvent a polymer casting solution of a blend of polyethersulfone, polyamine, polyfunctional glycidyl ether, and polyethylene glycol, forming a thin film of said polymer solution, precipitating the resulting film as a membrane having said network structure, and washing and drying the thus precipitated membrane.

29. A method of preparing a hydrophilic charge modified microporous filtration membrane having a network structure according to claim 2, comprising the steps of forming in a solvent a polymer casting solution of a blend of polyethersulfone, polyamine, polyfunctional glycidyl ether, polyethylene glycol, and a homopolymer of vinylpyrrolidone and/or quaternized co-polymer of vinylpyrrolidone and dimethylaminoethyl methacrylate, forming a thin film of said polymer solution, precipitating the resulting film as a membrane having said network structure, and washing and drying the thus precipitated membrane.

30. A method of preparing a hydrophilic charge modified microporous filtration membrane having a network structure according to claim 1, comprising the steps of forming in a solvent a polymer casting solution of a blend of polyethersulfone, polyamine, polyfunctional glycidyl ether, and polyethylene glycol, forming a thin film of said polymer solution, precipitating the resulting film as a membrane having said network structure, washing and drying the thus precipitated membrane, and baking the dried membrane sufficiently to stabilize said network structure.

31. A method of preparing a hydrophilic charge modified microporous filtration membrane having a network structure according to claim 2, comprising the steps of forming in a solvent a polymer casting solution of a blend of polyethersulfone, polyamine, polyfunctional glycidyl ether, polyethersulfone, polyamine, polyfunctional glycidyl ether, polyethylene glycol, and a homopolymer of vinylpyrrolidone and/or quaternized co-polymer of vinylpyrrolidone and dimethylaminoethyl methacrylate, forming a thin film of said polymer solution, precipitating the resulting film as a membrane having said network structure, washing and drying the thus precipitated membrane, and baking the dried membrane sufficiently to stabilize said network structure.

* * * * *